(12) United States Patent
Szwabowski et al.

(10) Patent No.: US 8,400,332 B2
(45) Date of Patent: Mar. 19, 2013

(54) EMOTIVE ADVISORY SYSTEM INCLUDING TIME AGENT

(75) Inventors: Steven Joseph Szwabowski, Northville, MI (US); Perry Robinson MacNeille, Lathrup Village, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 449 days.

(21) Appl. No.: 12/702,625

(22) Filed: Feb. 9, 2010

(65) Prior Publication Data

US 2011/0193726 A1 Aug. 11, 2011

(51) Int. Cl.
*G08G 1/123* (2006.01)
*B60Q 1/00* (2006.01)
*G06F 17/27* (2006.01)
*G10L 17/00* (2006.01)
*G10L 11/00* (2006.01)

(52) U.S. Cl. ............ 340/996; 340/425.5; 704/246; 704/251; 704/275

(58) Field of Classification Search ............ None
See application file for complete search history.

(56) References Cited

U.S. PATENT DOCUMENTS

| | | | |
|---|---|---|---|
| 6,249,720 B1 * | 6/2001 | Kubota et al. | 701/1 |
| 6,351,698 B1 * | 2/2002 | Kubota et al. | 701/51 |
| 2002/0055844 A1 * | 5/2002 | L'Esperance et al. | 704/260 |
| 2002/0156570 A1 * | 10/2002 | Ohtsuji et al. | 701/200 |
| 2007/0139182 A1 * | 6/2007 | O'Connor et al. | 340/521 |
| 2008/0269958 A1 | 10/2008 | Filev et al. | |
| 2010/0251283 A1 * | 9/2010 | Smith | 725/25 |

\* cited by examiner

*Primary Examiner* — Jennifer Mehmood
*Assistant Examiner* — Fekadeselassie Girma
(74) *Attorney, Agent, or Firm* — Jennifer M. Stec; Brooks Kushman P.C.

(57) ABSTRACT

An emotive advisory system for use by one or more occupants of an automotive vehicle includes a computer. The computer is configured to receive input indicative of an operating state of the vehicle. The computer determines at least one of a need to provide time information to an occupant based on the operating state of the vehicle and an occupant request to provide time information to the occupant. The computer generates data representing an avatar having an appearance, and data representing a spoken statement for the avatar. The spoken statement provides time information to the occupant in spoken dialog based on at least one of the need and the request. The computer outputs data representing the avatar for visual display, and data representing the statement for the avatar for audio play.

14 Claims, 6 Drawing Sheets

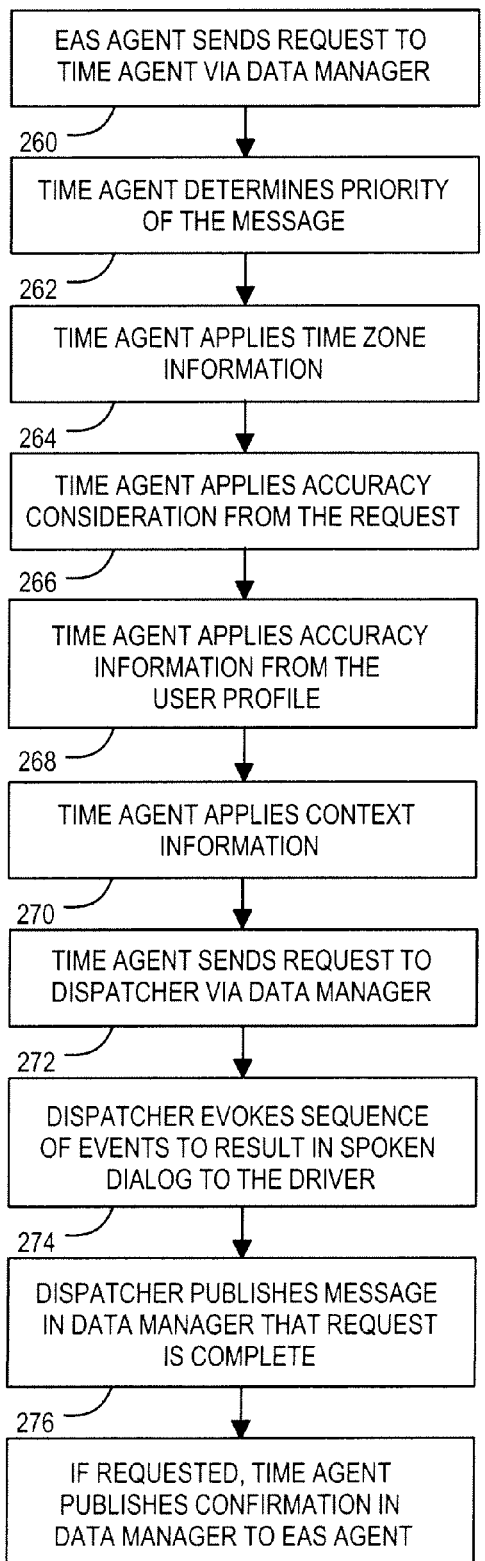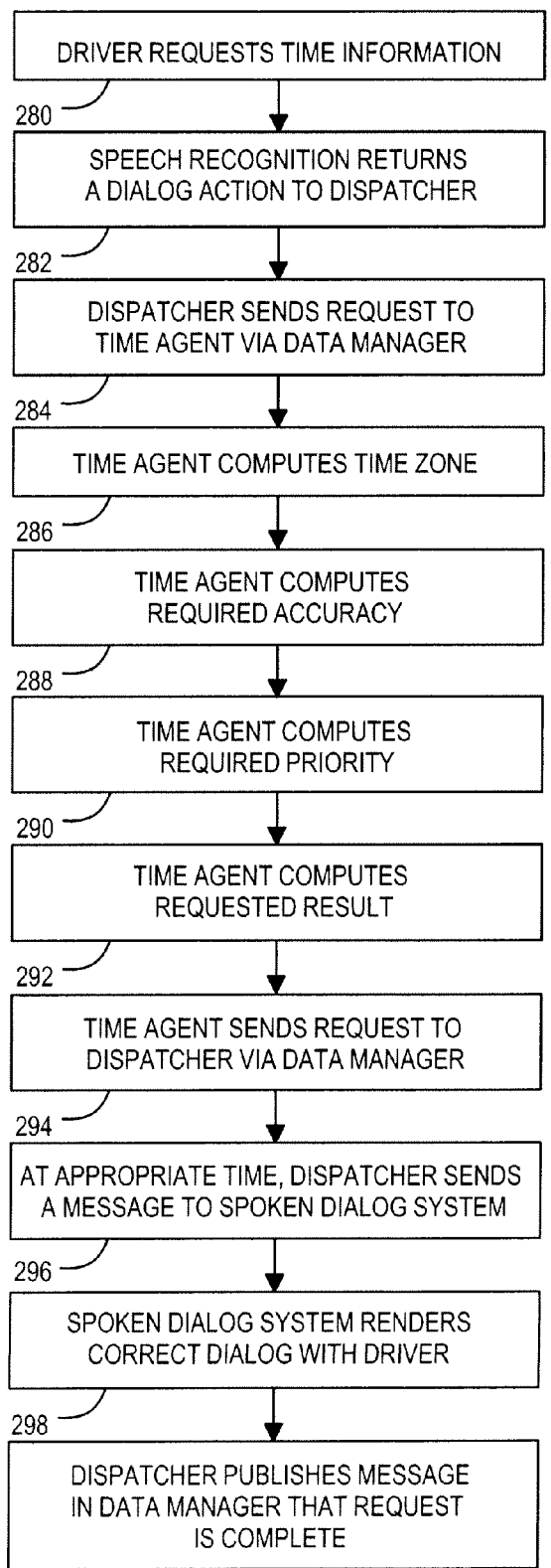
FIG. 9
FIG. 10

EMOTIVE ADVISORY SYSTEM INCLUDING TIME AGENT

BACKGROUND

1. Technical Field

The invention relates to an emotive advisory system (EAS) for use by one or more occupants of an automotive vehicle.

2. Background Art

Using the vehicle clock should be as easy for the driver as having a passenger in the car that can check the time for the driver. Further, it should be possible to display the time in an analog format so it will be easier to read. State of the art clock radios are difficult to use. The traditional analog clock that was visible on the dashboard has been eliminated because of overcrowding on the dash. The state of the art clock is an LED or LC display that displays the time in digital format periodically on a small display.

Reading the display always involves looking away from the road and waiting for the time to appear on the display. Often the display is not visible while using sunglasses or with near field visual impairment. Therefore, glasses must be taken off or put on before the time can be read, and while the time is being read it may not be possible to adequately see the road ahead. Further, state of the art clocks lack many of the features that could make them easy to use. A digital time display is inconvenient because one frequently needs to do some arithmetic to get the information one needs. For example, if you have a 1:10 PM appointment and your clock says 12:56 PM, you must do some mental arithmetic to determine that you have 14 minutes to get to your appointment.

State of the art clocks do not correct for daylight savings or the time zone. Neither can they tell you the time in Chicago when you are in Detroit. The driver should be able to ask the clock "how much longer?" and the clock tells you how many minutes to the destination. Unfortunately, vehicle clocks are not well integrated into other vehicle functions. There is no way; for example, to compute the time that fuel will run out or the time the vehicle will see sunrise or some bad weather.

In addition, the vehicle dashboard continues to grow increasingly complex. As new systems are added and existing systems become more complex there is added competition for space on the dashboard and the controls are increasingly difficult to use. New systems include navigation systems, MP3 players, hands free cell phone and satellite radio; while old systems that are becoming more complex are FM/AM radio, HVAC (heat, ventilation and air conditioning), vehicle lighting and drivetrain controls.

Increasingly there is a move away from conventional controls to human interfaces to manage this complexity. In one approach, multiple interfaces in an automotive vehicle are consolidated into a single interface in an emotive advisory system (EAS).

Background information may be found in U.S. Pub. No. 2008/0269958.

SUMMARY

In one embodiment of the invention, an emotive advisory system for use by one or more occupants of an automotive vehicle includes a computer. The computer is configured to receive input indicative of an operating state of the vehicle. The computer determines at least one of: (1) a need to provide time information to an occupant based on the operating state of the vehicle, and (2) an occupant request to provide time information to the occupant. The computer generates data representing an avatar having an appearance, and data representing a spoken statement for the avatar. The spoken statement provides time information to the occupant in spoken dialog based on at least one of: the need and the request. The computer outputs data representing the avatar for visual display, and data representing the statement for the avatar for audio play.

Embodiments of the invention may be implemented in a variety of ways. For example, the computer may be further configured to provide a natural language interface for communication with the occupant. For example, the appearance and the spoken statement may convey a simulated emotional state of the avatar to the occupant.

In one embodiment, the computer is further configured to receive input, in the form of spoken dialog, indicative of the occupant request to provide time information to the occupant. The spoken statement provides time information to the occupant in spoken dialog based on the request.

Time information provided in the spoken statement may be further based on user preferences, and/or may be further based on context information.

In one embodiment, the computer is further configured to determine the need to provide time information to the occupant based on a previous command received as input, in the form of spoken dialog, indicative of an alarm set by the occupant. The previous command may be further indicative of an urgency for the alarm.

In addition, it is appreciated that embodiments of the invention may provide time information based on information obtained from various sources. For example, the computer may be further configured to communicate with a navigation system of the automotive vehicle. In this case, the spoken statement provides time information to the occupant in spoken dialog based in part on information obtained from the navigation system. In other examples, the computer may communicate with a global positioning system of the automotive vehicle, or a time application server separate from the automotive vehicle.

In another embodiment, the invention comprehends an emotive advisory system for use by one or more occupants of an automotive vehicle comprising a computer; the computer is configured to determine a need to provide time information to an occupant based on an operating state of the vehicle. The computer generates data representing a spoken statement providing time information to the occupant in spoken dialog based on the need, and outputs the data representing the statement for audio play.

BRIEF DESCRIPTION OF THE DRAWINGS

FIG. 9 is a block diagram illustrating an EAS agent desiring to announce the time in one embodiment of the invention;

FIG. 10 is a block diagram illustrating a driver requesting time information in one embodiment of the invention.

DETAILED DESCRIPTION

Embodiments of the invention comprehend an emotive advisory system (EAS) for use by one or more occupants of an automotive vehicle. In one approach to implementing the system, various vehicle interfaces in the automotive vehicle are consolidated into a single interface in the emotive advisory system (EAS).

In general, the emotive advisory system (EAS) for the automotive vehicle emotively conveys information to an occupant. The system receives input indicative of an operating state of the vehicle, transforms the input into data representing a simulated emotional state and generates data representing an avatar that expresses the simulated emotional state. The avatar may be displayed. The system may receive a query from the occupant regarding the emotional state of the avatar, and respond to the query. An example emotive advisory system and method is described in U.S. Pub. No. 2008/0269958.

Figure 1:
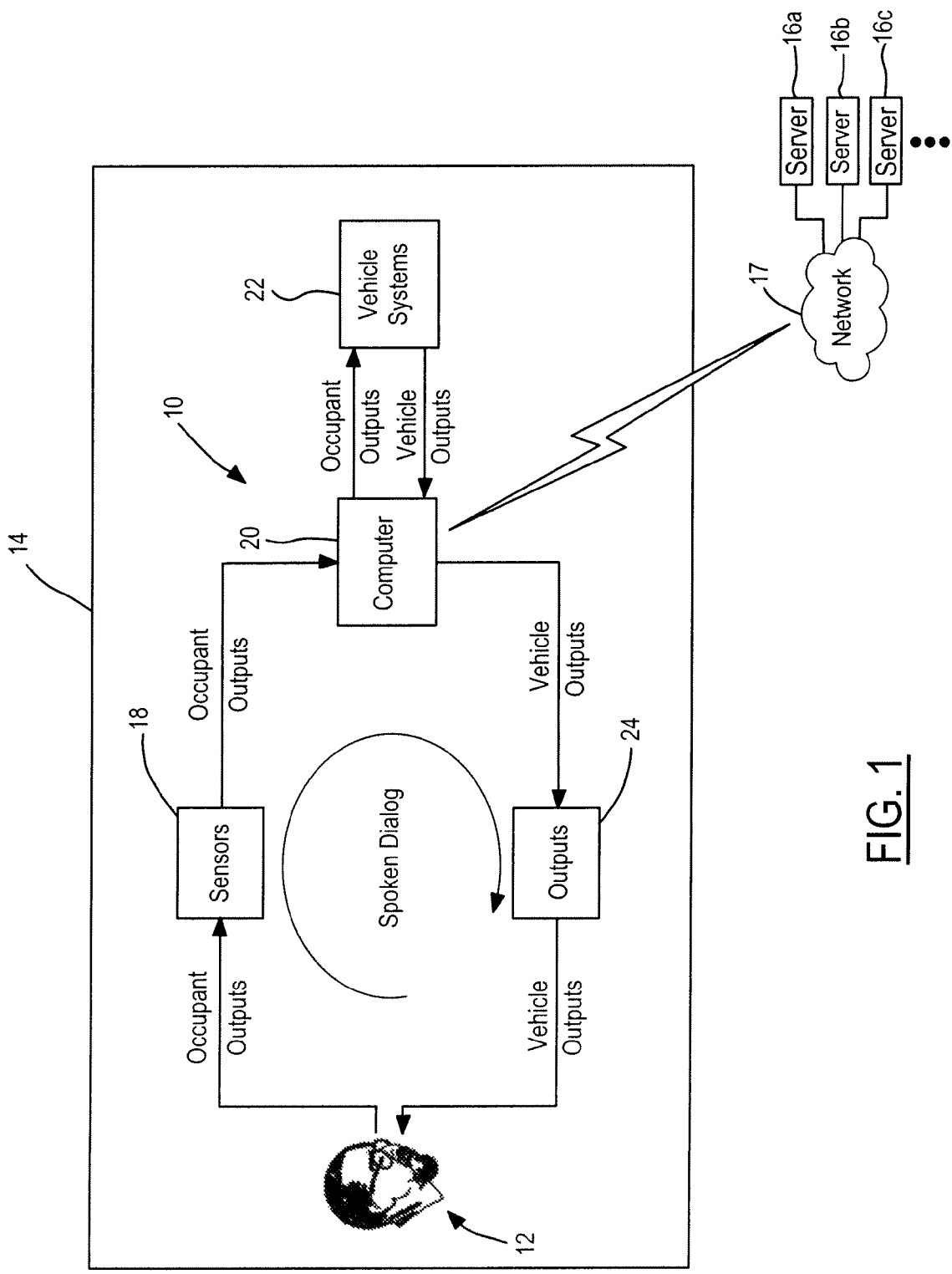
FIG. 1 is a block diagram of an emotive advisory system for an automotive vehicle, in one embodiment.

As shown in FIG. 1, an embodiment of an emotive advisory system (EAS) 10 assists an occupant/user 12 of a vehicle 14 in operating the vehicle 14 and in accessing information sources 16a, 16b, 16c, for example, web servers, etc., remote from the vehicle 14 via a network 17. Of course, other embodiments of the EAS 10 may be implemented within the context of any type of device and/or machine. For example, the EAS 10 may accompany a household appliance, handheld computing device, etc. Certain embodiments of the EAS 10 may be implemented as an integrated module that may be docked with another device and/or machine. A user may thus carry their EAS 10 with them and use it to interface with devices and/or machines they wish to interact with. Other configurations and arrangements are also possible.

In the embodiment of FIG. 1, sensors 18 detect inputs generated by the occupant 12 and convert them into digital information for a computer 20. The computer 20 receives these inputs as well as inputs from the information sources 16a, 16b, 16c and vehicle systems 22. The computer 20 processes these inputs and generates outputs for at least one of the occupant 12, information sources 16a, 16b, 16c and vehicle systems 22. Actuators/outputs, etc. 24 convert the outputs for the occupant 12 from a digital format into a format that may be perceived by the occupant 12, whether visual, audible, tactile, haptic, etc.

The occupant 12 may, in some embodiments, communicate with the EAS 10 through spoken dialog that follows rules of discourse (for example, Grice's maxims). For example, the occupant 12 may ask "Are there any good restaurants in the area?" In response, the EAS 10 may query appropriate information sources 16a, 16b, 16c and, together with geographic location information from the vehicle systems 22, determine a list of highly rated restaurants near the current location of the vehicle 14. The EAS 10 may answer with the simulated dialog: "There are a few. Would you like to hear the list?" An affirmative response from the occupant 12 may cause the EAS 10 to read the list.

The occupant 12 may also command the EAS 10 to alter certain parameters associated with the vehicle systems 22. For example, the occupant 12 may state "I feel like driving fast today." In response, the EAS 10 may ask "Would you like the drivetrain optimized for performance driving?" An affirmative response from the occupant 12 may cause the EAS 10 to alter engine tuning parameters for enhanced performance.

In some embodiments, the spoken dialog with the EAS 10 may be initiated without pressing any buttons or otherwise physically providing input to the EAS 10. This open microphone functionality allows the occupant 12 to initiate a conversation with the EAS 10 in the same way the occupant 12 would initiate a conversation with another occupant of the vehicle 14.

The occupant 12 may also "barge in" on the EAS 10 while it is speaking. For example, while the EAS 10 is reading the list of restaurants mentioned above, the occupant 12 may interject "Tell me more about restaurant X." In response, the EAS 10 may cease reading the list and query appropriate information sources 16a, 16b, 16c to gather additional information regarding restaurant X. The EAS 10 may then read the additional information to the occupant 12.

In some embodiments, the actuators/outputs 24 include a screen that selectively displays an avatar. The avatar may be a graphical representation of human, animal, machine, plant, vehicle, etc. and may include features, for example, a face, etc., that are capable of visually conveying emotion. The avatar may be hidden from view if, for example, a speed of the vehicle 14 is greater than a threshold which may be manufacturer or user defined. The avatar's voice, however, may continue to be heard. Of course, any suitable type of display technology, such as a holographic or head-up display, may be used.

The avatar's simulated human emotional state may depend on a variety of different criteria including an estimated emotional state of the occupant 12, a condition of the vehicle 14 and/or a quality with which the EAS 10 is performing a task, etc. For example, the sensors 18 may detect head movements, speech prosody, biometric information, etc. of the occupant 12 that, when processed by the computer 20, indicate that the occupant 12 is angry. In one example response, the EAS 10 may limit or discontinue dialog that it initiates with the occupant 12 while the occupant 12 is angry. In another example response, the avatar may be rendered in blue color tones with a concerned facial expression and ask in a calm voice "Is something bothering you?" If the occupant 12 responds by saying "Because of this traffic, I think I'm going to be late for work," the avatar may ask "Would you like me to find a faster route?" or "Is there someone you would like me to call?" If the occupant 12 responds by saying "No. This is the only way . . .," the avatar may ask "Would you like to hear some classical music?" The occupant 12 may answer "No. But could you tell me about the upcoming elections?" In response, the EAS 10 may query the appropriate information sources 16a, 16b, 16c to gather the current news regarding the elections. During the query, if the communication link with the information sources 16a, 16b, 16c is strong, the avatar may appear happy. If, however, the communication link with the information sources 16a, 16b, 16c is weak, the avatar may appear sad, prompting the occupant to ask "Are you having difficulty getting news on the elections?" The avatar may answer "Yes, I'm having trouble establishing a remote communication link."

During the above exchange, the avatar may appear to become frustrated if, for example, the vehicle 14 experiences frequent acceleration and deceleration or otherwise harsh handling. This change in simulated emotion may prompt the occupant 14 to ask "What's wrong?" The avatar may answer "Your driving is hurting my fuel efficiency. You might want to cut down on the frequent acceleration and deceleration." The avatar may also appear to become confused if, for example, the avatar does not understand a command or query from the occupant 14. This type of dialog may continue with the avatar dynamically altering its simulated emotional state via its appearance, expression, tone of voice, word choice, etc. to convey information to the occupant 12.

The EAS 10 may also learn to anticipate requests, commands and/or preferences of the occupant 12 based on a history of interaction between the occupant 12 and the EAS 10. For example, the EAS 10 may learn that the occupant 12 prefers a cabin temperature of 72° Fahrenheit when ambient temperatures exceed 80° Fahrenheit and a cabin temperature of 78° Fahrenheit when ambient temperatures are less than 40° Fahrenheit and it is a cloudy day. A record of such climate control settings and ambient temperatures may inform the EAS 10 as to this apparent preference of the occupant 12. Similarly, the EAS 10 may learn that the occupant 12 prefers to listen to local traffic reports upon vehicle start-up. A record of several requests for traffic news following vehicle start-up may prompt the EAS 10 to gather such information upon vehicle start-up and ask the occupant 12 whether they would like to hear the local traffic. Other learned behaviors are also possible.

These learned requests, commands and/or preferences may be supplemented and/or initialized with occupant-defined criteria. For example, the occupant 12 may inform the EAS 10 that it does not like to discuss sports but does like to discuss music, etc. In this example, the EAS 10 may refrain from initiating conversations with the occupant 12 regarding sports but periodically talk with the occupant 12 about music.

It is appreciated that an emotive advisory system (EAS) may be implemented in a variety of ways, and that the description herein is exemplary. Further more detailed description of an example emotive advisory system is provided in U.S. Pub. No. 2008/0269958. In general, with continuing reference to FIG. 1, computer 20 communicates with information sources 16a, 16b, 16c, and communicates with various peripheral devices such as buttons, a video camera, a vehicle BUS controller, a sound device and a private vehicle network. The computer 20 also communicates with a display on which the avatar may be rendered. Other configurations and arrangements are, of course, also possible.

Figure 2:
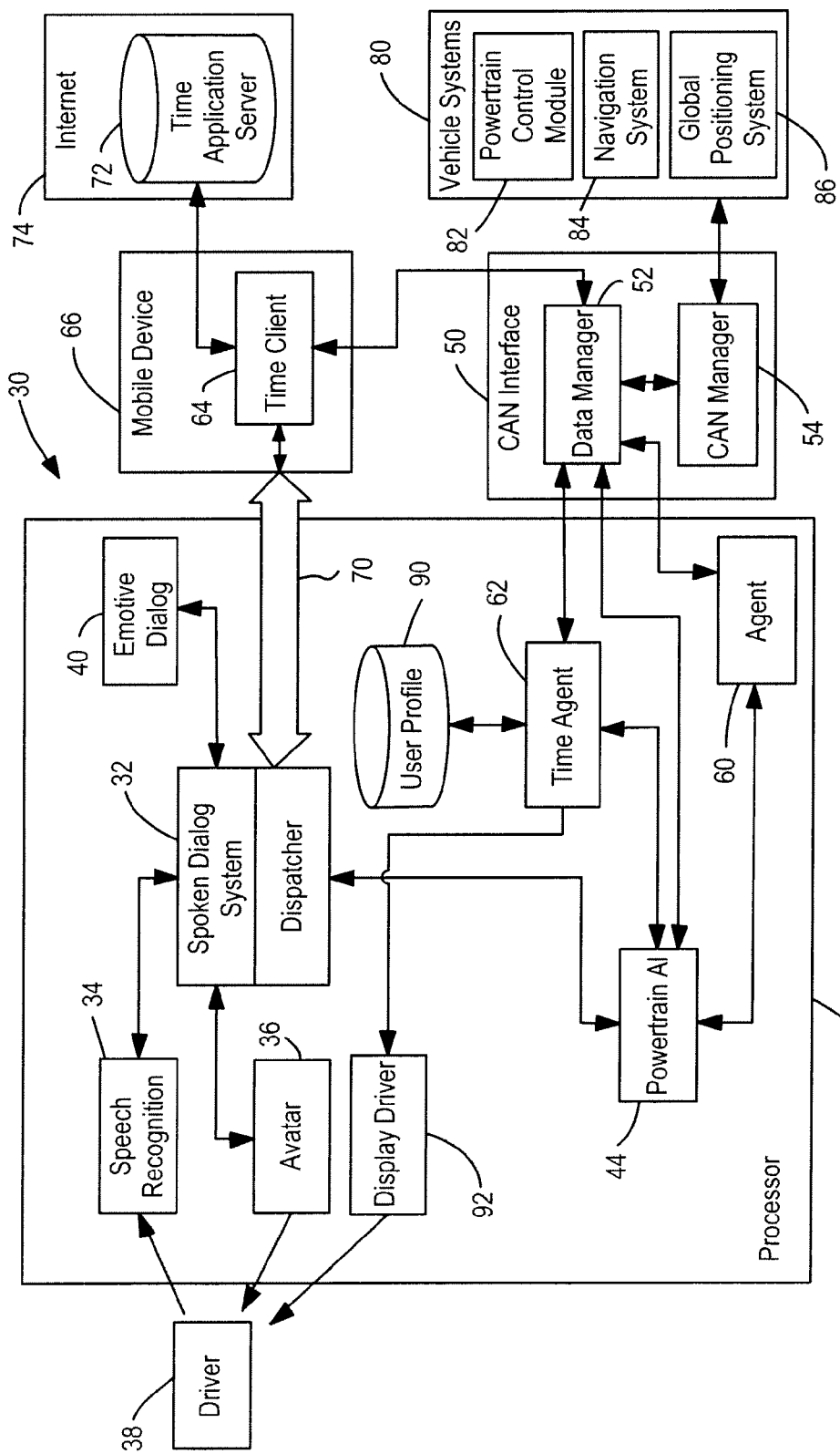
FIG. 2 is a block diagram of an emotive advisory system for an automotive vehicle, including a time agent, in one embodiment.

FIG. 2 illustrates a block diagram of an emotive advisory system (EAS) 30 for an automotive vehicle, in an example embodiment. EAS 30 is illustrated at a more detailed level, and may operate generally in the same manner described above for EAS 10 of FIG. 1. As shown, spoken dialog system/dispatcher 32 communicates with speech recognition component 34 and avatar component 36, which interface with the driver 38. As well, spoken dialog system/dispatcher 32 also communicates with emotive dialog component 40. Various components of EAS 30 are implemented at processor 42. Processor 42 may take the form of any suitable device as appreciated by those skilled in the art. For example, processor 42 may be implemented as a control module on the vehicle. In more detail, powertrain AI 44 communicates with spoken dialog system/dispatcher 32, and with Controller Area Network (CAN) interface 50, which is composed of data manager 52 and CAN manager 54. CAN is an embedded network currently used in vehicles. Other implementations are possible.

Middleware links EAS 30 with one or more software agents 60, including time agent 62. In general, a software agent may be an independent program that interacts with the EAS 30 illustrated in FIG. 2 (or EAS 10 of FIG. 1) to implement specific tasks/functions. For example, an agent implements a specific task or function, and may utilize the spoken dialog system/dispatcher 32 and other system components to interact with the driver 38.

A software agent may be configured to receive a variety of inputs. The agent may process these inputs, provide a variety of outputs and perform its designated task(s) in accordance with the inputs. The agent may also process vehicle system outputs. The agent may also output an emotional output, for presentation by avatar 36, that is an indicator of how well the agent is performing its intended function.

In accordance with the illustrated embodiment of the invention, the clock is implemented as an EAS agent, time agent 62. EAS system 30 allows the clock to interact with the driver 38 via spoken dialog, rather than passively waiting for clock information.

A time client 64 is implemented on a mobile device 66. Mobile device 66 may take the form of any suitable device as is appreciated by those skilled in the art, and communicates over link 70 with the spoken dialog system/dispatcher 32. For example, mobile device 66 may take the form of a mobile telephone or PDA. In one implementation, ARM Hardware (ARM Holdings, Cambridge, England, UK) and Windows Mobile operating system (Microsoft Corporation, Redmond, Wash.) are used. Time client 64 communicates with time application server 72, which is shown located on the Internet 74.

With continuing reference to FIG. 2, further details of the example embodiment are described. Look-away events are eliminated by the use of a voice interface. Further, EAS 30 may use its context aware recommender system to anticipate the driver's needing clock information and provide it proactively. Clock information can be displayed visually by command on the EAS screen by replacing the navigation or avatar panels with clock graphics. Clock information could also be displayed on a heads up display. In this case, look-aways are minimized because the information is available when the driver requests it. The EAS clock/time agent 62 is integrated with other agents 60 in the EAS system 30 via the EAS message oriented middleware (MOM). As well, EAS 30 is in communication with various vehicle systems 80 including, for example, powertrain control module 82, navigation system 84, and global positioning system 86, via the CAN interface 50.

Time agent 62 is able, therefore, to get current time, position, speed, bearing, sunrise, sunset, etc. information from the GPS 86, route information such as the estimated time of arrival, the time to the next exit, from the navigation system 84. Time agent 62 can retrieve geocode information from web sources such as the time zone for a zip code at a particular address or GPS location. In this way time agent 62 can respond to a wide variety of driver requests such as: "What is the time in Chicago?"; "What is the current time in my current location?"; "What time will it be when I see the sunset?"; "Where will I be at sunset?"; "Where will I be around lunch time?"; or "Where will I be at 5:00?"

The EAS clock agent 62 can also set alarms to take place at a specific time and urgency. The driver might evoke one of several spoken commands to set an alarm, for example: "Tell me the time every half hour"; "Tell me the time in an hour"; "Tell me the time at sunrise." As with all time commands, these can be given an urgency level by saying for example: "interrupt the news to tell me the time in one half hour." The EAS clock agent 62 is also capable of setting alarms for other agents, so if the fuel monitor agent needs an alarm every 10 minutes to update the fuel parameters it can set an alarm with the clock agent 62 that will wake it up on the preset interval.

Further, an alarm could provide a chime or ringtone of the driver's choice so as to provide some time information without interrupting audio entertainment or EAS spoken dialog. For example, a chime or ringtone could provide "top of the hour" information without interrupting audio entertainment or EAS spoken dialog. Other alarms could also be implemented as a chime or ringtone, as desired. The driver may evoke a command to set a chime or ringtone as an alarm, for example: "Chime at the top of each hour"; "Play my favorite ringtone in one hour"; "Chime 20 minutes before sunset."

Further, time agent 62 can take actions in accordance with user preferences stored as a user profile 90. Time agent 62 is also shown interfacing with display driver 92, as discussed above.

It is appreciated that EAS 10, EAS 30, software time agent 62, and other illustrated systems and components are only examples, and various implementations of the invention are possible.

Figure 3:
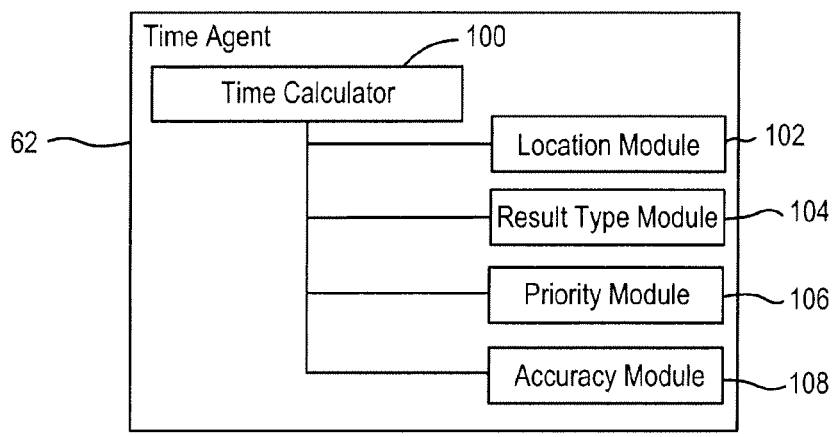
FIG. 3 illustrates an embodiment of the time agent, including various functional modules.

FIG. 3 illustrates an embodiment of the time agent, including various functional modules. In more detail, time agent 62 is composed of various components to implement the desired functionality. Time agent 62 including the various components may be implemented in software and/or in any suitable way as appreciated by one of ordinary skill in the art. As shown in FIG. 3, time agent 62 includes time calculator component 100, location module 102, result type module 104, priority module 106, and accuracy module 108.

Figure 4:
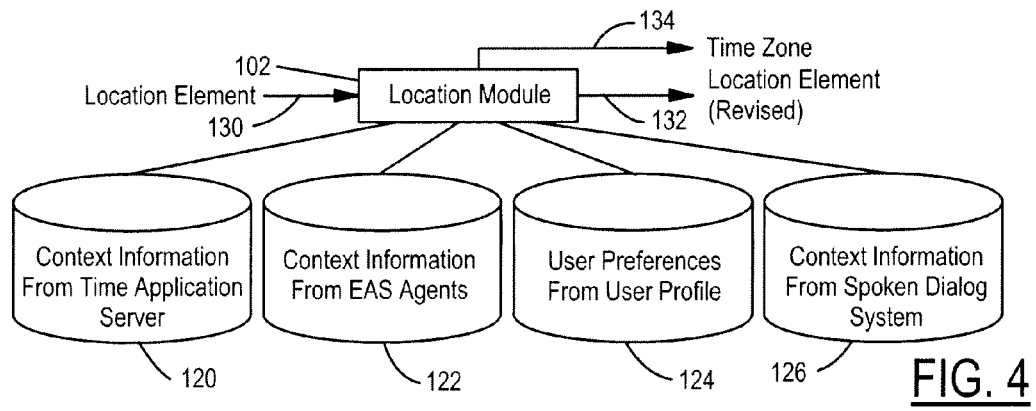
FIGS. 4-7 illustrate operation of the various functional modules of the time agent.

FIGS. 4-7 illustrate operation of the various functional modules 102, 104, 106, 108 of the time agent 62. In FIG. 4, location module 102 is in communication with context information 120 from time application server 72, context information 122 from other EAS agents 60, user preferences 124 from user profile 90, and context information 126 from the spoken dialog system 32. Location module 102 receives location element 130 as input, and produces outputs including a revised location element 132 and time zone information 134.

Figure 5:
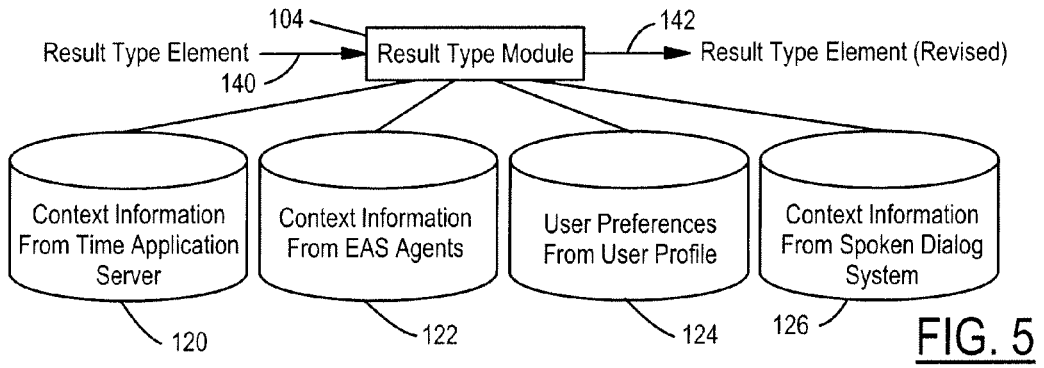

In FIG. 5, result type module 104 is in communication with context information 120 from time application server 72, context information 122 from other EAS agents 60, user preferences 124 from user profile 90, and context information 126 from the spoken dialog system 32. Result type module 104 receives result type element 140 as input, and produces revised result type element 142 as output.

Figure 6:
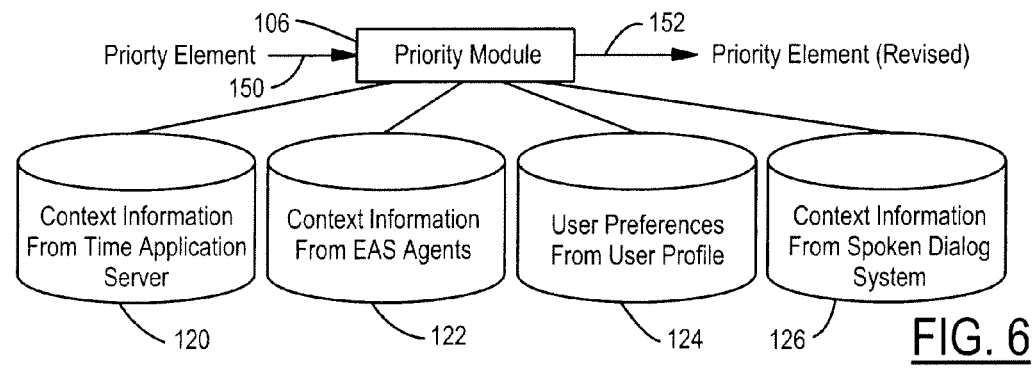

In FIG. 6, priority module 106 is in communication with context information 120 from time application server 72, context information 122 from other EAS agents 60, user preferences 124 from user profile 90, and context information 126 from the spoken dialog system 32. Priority module 106 receives priority element 150 as input, and produces revised priority element 152 as output.

Figure 7:
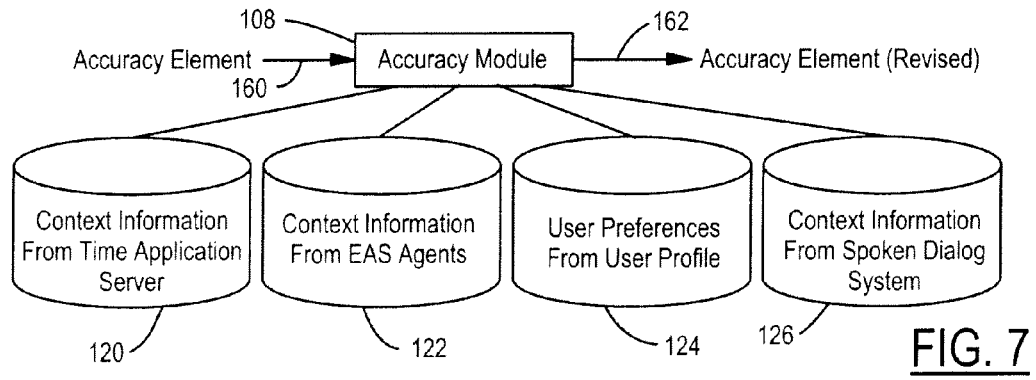

In FIG. 7, accuracy module 108 is in communication with context information 120 from time application server 72, context information 122 from other EAS agents 60, user preferences 124 from user profile 90, and context information 126 from the spoken dialog system 32. Accuracy module 108 receives accuracy element 160 as input, and produces accuracy element 162 as output.

FIGS. 8A-8D illustrate aspects of a message protocol for the time agent, in the illustrated embodiment. For example, an EAS agent may desire to announce the time, a driver may request time information, or an EAS agent may desire to know the time. In general, time requests (by an agent or the driver), agent announcements, and time results from the time agent follow a defined message protocol. FIGS. 8A-8D illustrate one possibility for such a protocol. The diagrams in FIGS. 8A-8D represent extensible markup language (XML) documents/messages, but it is appreciated that other message or object formats are possible.

Figure 8B:
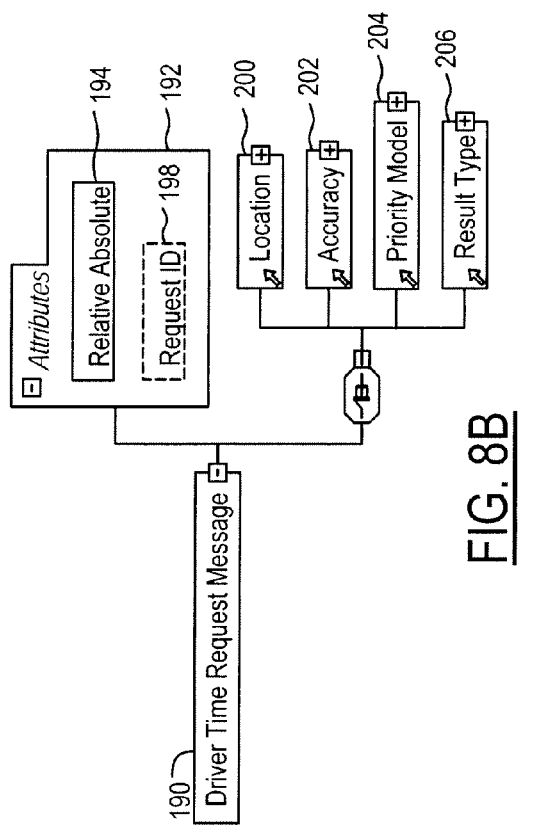
FIGS. 8A-8D illustrate aspects of a message protocol for the time agent.
Figure 8D:
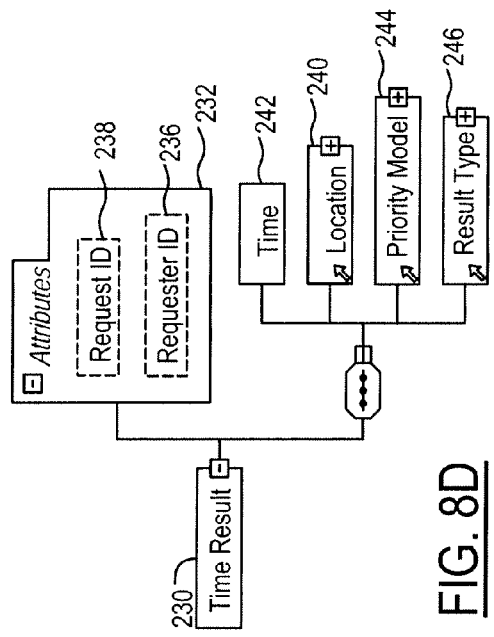
Figure 8A:
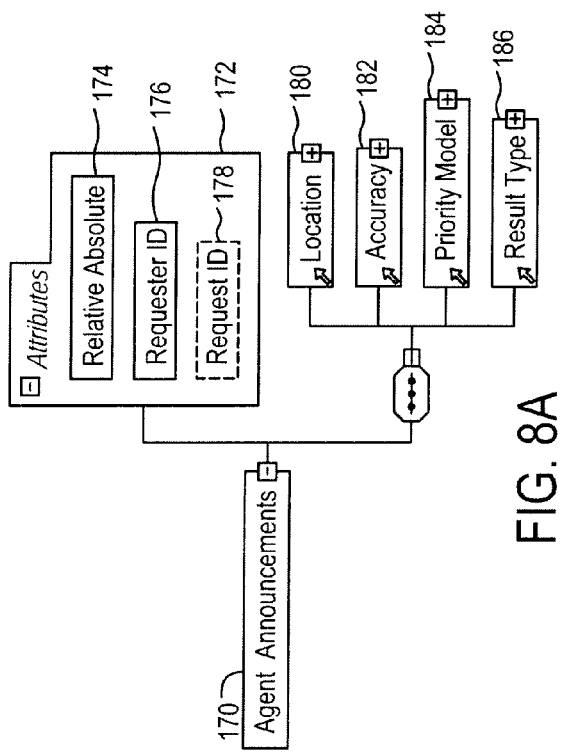

FIG. 8A illustrates a top level element for an agent announcement at 170. In more detail, FIG. 8A is illustrating the message protocol used by an EAS agent that desires to announce the time. The agent announcement element 170 includes attributes 172, including relative/absolute attribute 174, requestor ID attribute 176, and request ID attribute 178. The agent announcement element 170 includes sub-elements including location element 180, accuracy element 182, priority model element 184, and result type element 186.

FIG. 8B illustrates a top level element for a driver time request message at 190. In more detail, FIG. 8B is illustrating the message protocol used for a time request by the driver. The driver time request message element 190 includes attributes 192, including relative/absolute attribute 194, and request ID attribute 198. The driver time request message element 190 includes sub-elements including location element 200, accuracy element 202, priority model element 204, and result type element 206.

Figure 8C:
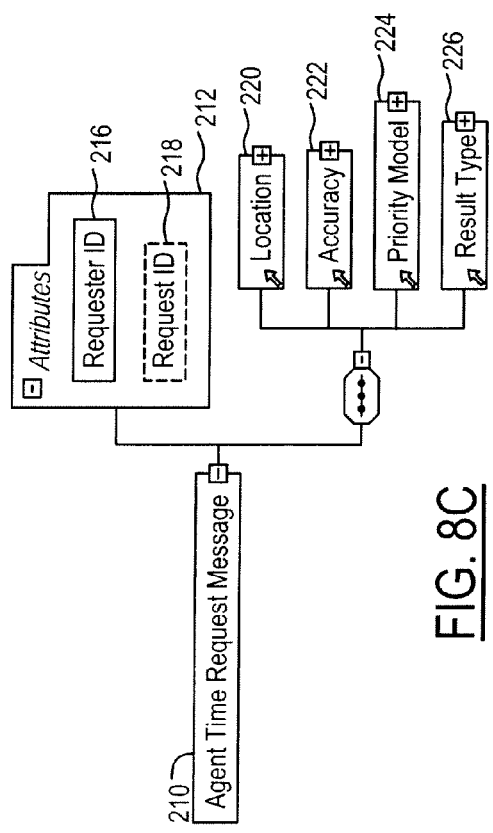

FIG. 8C illustrates a top level element for an agent time request message at 210. In more detail, FIG. 8C is illustrating the message protocol used for a time request by an EAS agent that wants to know certain time information. The agent time request message element 210 includes attributes 212, including requestor ID attribute 216, and request ID attribute 218. The agent time request message element 210 includes sub-elements including location element 220, accuracy element 222, priority model element 224, and result type element 226.

FIG. 8D illustrates a top level element for a time result at 230. In more detail, FIG. 8D is illustrating the message protocol used for a time result from the time agent. The time result 230 includes attributes 232, including requestor ID attribute 236, and request ID attribute 238. The time result element 230 includes sub-elements including location element 240, time element 242, priority model element 244, and result type element 246.

With continuing reference to FIGS. 8A-8D, in general, a relative/absolute attribute indicates whether the message relates to a relative time or an absolute time; a requestor ID attribute indicates the requesting or announcing EAS agent; and a request ID attribute indicates a unique ID for the particular request. Further, in general, a location sub-element indicates the location for the particular time of interest because time is different at different locations (time zones). The location sub-element in a message to the time agent is processed by location module 102 (FIG. 4) to produce the location sub-element for the time result. An accuracy sub-element indicates the accuracy required for the particular time of interest, for example; night or day; morning, afternoon, or evening; nearest quarter hour; etc. The accuracy sub-element in a message to the time agent is processed by accuracy module 108 (FIG. 7) to produce the accuracy for the time result.

A priority model sub-element indicates the priority for the particular request or announcement, for example, critical or informational. The priority sub-element in a message to the time agent is processed by priority module 106 (FIG. 6) to produce the priority sub-element for the time result.

A result type sub-element indicates the result type for the particular request or announcement, for example; an estimated absolute time at which the driver will reach a particular destination, point of interest, or location; a relative time such as how much longer until some event, or how long it has been since some event, etc.; or a location of where the driver will be at some time of interest. The result type sub-element in a message to the time agent is processed by result type module 104 (FIG. 5) to produce the result type sub-element for the time result.

A time sub-element indicates the time associated with the time result element 230.

FIG. 9 is a block diagram illustrating an EAS agent desiring to announce the time in one embodiment of the invention. At block 260, an EAS agent sends a request to the time agent via the data manager. The time agent receives the request. At block 262, the time agent determines a priority of the message. The time agent processes the request to produce a time result. In more detail, at block 264, the time agent applies time zone information. At block 266, the time agent applies accuracy information from the request; and at block 268, the time agent applies accuracy information from the user profile. At block 270, the time agent, generally, applies context information.

At block 272, upon determining the time result, the time agent sends a request to the dispatcher via the data manager. At block 274, the dispatcher evokes a sequence of events to result in spoken dialog to the driver. At block 276, the dispatcher publishes a message in the data manager that the request is complete. At block 278, if requested, the time agent publishes confirmation in the data manager to the requesting EAS agent.

FIG. 10 is a block diagram illustrating a driver requesting time information in one embodiment of the invention. At block 280, the driver requests time information, for example, by a spoken request. At block 282, the speech recognition of the EAS system returns a dialog action to the dispatcher for processing. At block 284, the dispatcher sends a request to the time agent via the data manager.

The time agent processes the received request. At block 286, the time agent computes the time zone. At block 288, the time agent computes the required accuracy. At block 290, the time agent computes the required priority. The time result is computed at block 292. At block 294, the time agent sends a request to the dispatcher via the data manager. At block 296, at the appropriate time, the dispatcher sends a message to the spoken dialog system. At block 298, the spoken dialog system renders correct dialog with the driver. At block 300, the dispatcher publishes a message in the data manager that the request is complete.

Figure 11:
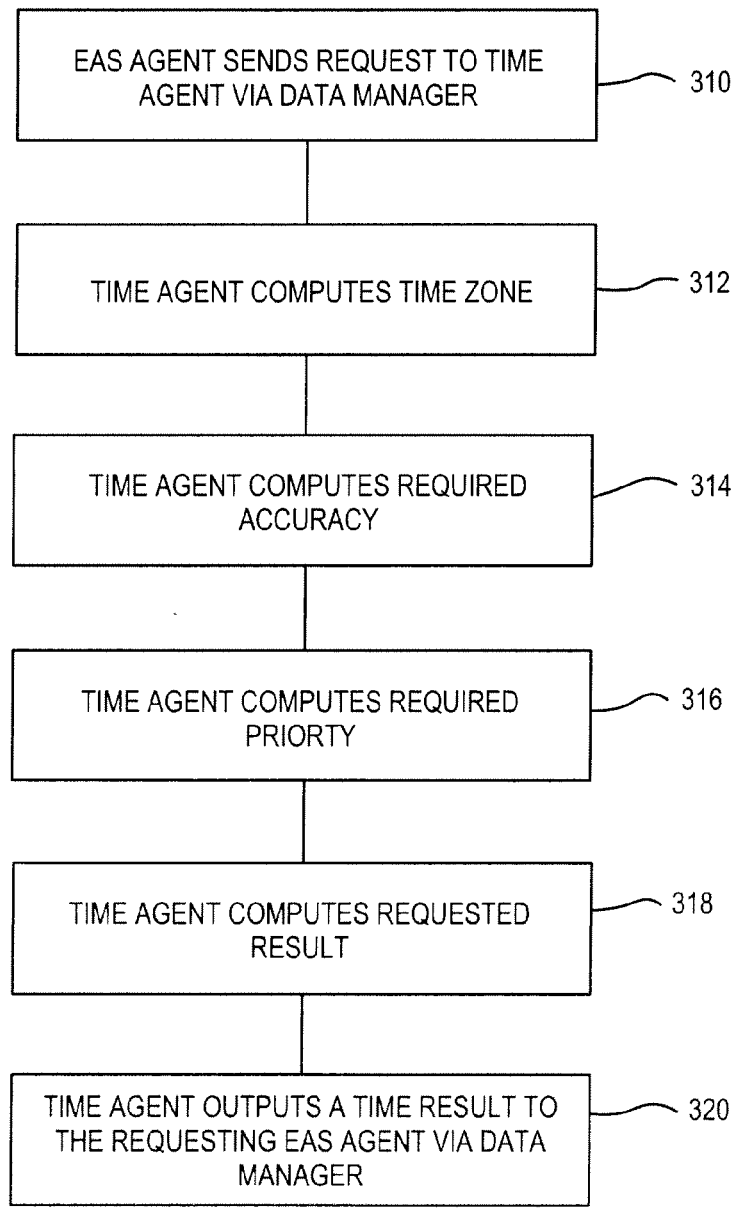
FIG. 11 is a block diagram illustrating an EAS agent desiring to know the time in one embodiment of the invention.

FIG. 11 is a block diagram illustrating an EAS agent desiring to know the time in one embodiment of the invention. At block 310, an EAS agent sends a request to the time agent via the data manager. At block 312, the time agent computes the time zone. At block 314, the time agent computes the required accuracy. At block 316, the time agent computes the required priority. At block 318, the time agent computes the requested result. At block 320, the time agent outputs a time result to the time requesting EAS agent via a data manager.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An emotive advisory system for a vehicle comprising:
   a computer configured to
      receive input indicative of an operating state of the vehicle,
      determine a need to provide time information to an occupant based on the operating state of the vehicle and a previous command received as spoken dialog input indicative of an alarm set by the occupant,
      generate data representing an avatar having an appearance and data representing a spoken statement for the avatar, the spoken statement providing time information to the occupant in spoken dialog based on the need,
      output the data representing the avatar for visual display, and
      output the data representing the statement for the avatar for play.

2. The emotive advisory system of claim 1 wherein the computer is further configured to:
   provide a natural language interface for communication with the occupant.

3. The emotive advisory system of claim 1 wherein the appearance and the spoken statement convey a simulated emotional state of the avatar to the occupant.

4. The emotive advisory system of claim 1 wherein the computer is further configured to:
   determine the time information provided in the spoken statement based on the need, and further based on learned user preferences.

5. The emotive advisory system of claim 1 wherein the computer is further configured to:
   determine the time information provided in the spoken statement based on the need, and further based on context information.

6. The emotive advisory system of claim 1 wherein the previous command is further indicative of an urgency for the alarm.

7. The emotive advisory system of claim 1 wherein the computer is further configured to:
   communicate with a navigation system of the automotive vehicle,
   wherein the spoken statement provides time information to the occupant in spoken dialog based in part on information obtained from the navigation system.

8. The emotive advisory system of claim 1 wherein the computer is further configured to:
   communicate with a global positioning system of the automotive vehicle,
   wherein the spoken statement provides time information to the occupant in spoken dialog based in part on information obtained from the global positioning system.

9. The emotive advisory system of claim 1 wherein the computer is further configured to:
   communicate with a time application server separate from the automotive vehicle,
   wherein the spoken statement provides time information to the occupant in spoken dialog based in part on information obtained from the time application server.

10. An advisory system for a vehicle comprising:
    a computer configured to
       determine a need to provide time information to an occupant based on an operating state of the vehicle and a previous command received as spoken dialog input indicative of an alarm set by the occupant,
       generate data representing a spoken statement providing time information to the occupant in spoken dialog based on the need, and
       output the data representing the statement for play.

11. The advisory system of claim 10 wherein the computer is further configured to:
    provide a natural language interface for communication with the occupant.

12. The advisory system of claim 10 wherein the computer is further configured to:
    determine the time information provided in the spoken statement based on the need, and further based on user preferences.

13. The advisory system of claim 10 wherein the computer is further configured to:
    determine the time information provided in the spoken statement based on the need, and further based on context information.

14. The advisory system of claim 10 wherein the previous command is further indicative of an urgency for the alarm.

* * * * *